United States Patent [19]

Paar

[11] Patent Number: 4,973,613

[45] Date of Patent: Nov. 27, 1990

[54] LEAD-FREE CATHODICALLY DEPOSITABLE ELECTRODEPOSITION PAINTS BASED ON THE REACTION PRODUCT OF β-HYDROXYALKYLAMINES, TITANIUM COMPOUNDS, AND FORMALDEHYDE

[75] Inventor: Willibald Paar, Graz, Austria

[73] Assignee: Vianova Kunstharz A.G., Werndorf, Austria

[21] Appl. No.: 370,690

[22] Filed: Jun. 23, 1989

[30] Foreign Application Priority Data

Jun. 24, 1988 [AT] Austria .................................. 1638/88

[51] Int. Cl.$^5$ ...................... C08G 59/14; C08L 63/00; C09D 5/44
[52] U.S. Cl. .................................... 523/404; 523/414; 523/415; 523/417; 523/421; 525/523; 525/526; 525/531; 528/92; 528/107
[58] Field of Search ............... 523/404, 414, 415, 417, 523/421; 525/523, 526, 531; 528/107, 92

[56] References Cited

U.S. PATENT DOCUMENTS

| | | | |
|---|---|---|---|
| 3,812,214 | 5/1974 | Markovitz | 525/507 |
| 4,384,946 | 5/1983 | Patzchke et al. | 523/414 |
| 4,397,990 | 8/1983 | Kooymans et al. | 525/167 |
| 4,788,234 | 11/1988 | Schipfer et al. | 528/92 |
| 4,837,291 | 1/1989 | Paar | 525/504 |

*Primary Examiner*—John Kight, III
*Assistant Examiner*—Frederick Krass
*Attorney, Agent, or Firm*—A. W. Breiner

[57] ABSTRACT

Cathodically depositable electrodeposition paints contain binder combinations of cationic film-forming resins with organic titanium compounds which are obtained by reacting tetraalkyl orthotitanates or titanium acetyl acetonates with NH-functional β-hydroxyalkylamine compounds, subsequently reacting with formaldehyde and with removal of the alcohol and/or acetyl acetone formed. The stoved paint films exhibit an excellent anti-corrosion effect on non-pretreated sheet steel.

9 Claims, No Drawings 4,973,613

LEAD-FREE CATHODICALLY DEPOSITABLE ELECTRODEPOSITION PAINTS BASED ON THE REACTION PRODUCT OF βHYDROXYALKYLAMINES, TITANIUM COMPOUNDS, AND FORMALDEHYDE

RELATED APPLICATIONS

This application relates to commonly assigned U.S. applications Ser. No. 334,526 filed Apr. 7, 1989 and Ser. No. 351,072 filed May 12, 1989, each entitled "Cathodically Depositable Electrodeposition Paints."

FIELD OF INVENTION

This invention relates to cathodically depositable electrodeposition paints which have an outstanding corrosion preventive effect on non-pretreated sheet steel. More particularly, the present invention relates to cathodically depositable electrodeposition paints comprising a binder, water-soluble in partial or totally neutralized form, which contain a cationic film-forming resin and a select titanium compound.

BACKGROUND OF INVENTION

Cathodically depositable paints generally have very good corrosion resistance on zinc phosphate-treated substrates. Adequate corrosion resistance on non-pretreated sheet steel, referred to as bright sheet steel, heretofore could only be achieved, however, by the addition of lead compounds in a suitable form. All lead compounds heretofore used for this purpose in cathodically depositable electrodeposition paints have major disadvantages. The lead compounds used as solid substances, such as lead oxide or basic lead silicate, can only be dissolved in the finished paint. The paints, therefore, must undergo fairly long homogenization periods until the lead salt has attained its required efficacy as a catalyst. The water-soluble salts thus formed, like other water-soluble salts added directly to the paint, extend into the aqueous phase of the paint rather than into the resin micelles. Accordingly, during electrodeposition of the paint, as a result of the endosmosis effect occurring in the film, which results in dehydrating the film, the water-soluble salts are washed out of the film or are precipitated onto the substrate as a metallic deposit. Dissolved salts are also removed to some extent from the electrodeposition bath by the dialysis equipment used in electrodeposition paint equipment and possibly recycled into the bath in uncontrolled manner during the rinsing operation.

The water-insoluble salts of longer-chained fatty acids are soluble in the resin and, therefore, remain to a large extent in the resin micelle. However, hydrolysis produces measurable quantities of water-insoluble fatty acids which considerably disturb the precipitation process and the control of the bath during electrodeposition painting.

Lead catalysts suitable for cathodic electrodeposition painting are described in Austrian Application Ser. No. 2760/86, which corresponds to U.S. application Ser. No. 109,521 filed Oct. 19, 1987, now U.S. Pat. No. 4,788,234 issued Nov. 29, 1988. The described catalysts which are reaction products of lead (II) oxide and compounds containing β-hydroxyalkylamino groups do not have the usual disadvantages as above described. However, there is an increasing tendency in industry to avoid using lead compounds in paints because of the toxicity of the compounds and the resultant disposal problems. On the other hand, however, adequate corrosion prevention of bright sheet steel is an essential requirement of users of cathodically depositable electrodeposition paints, particularly in the automobile industry.

Cathodically depositable electrodeposition binders which crosslink through transesterification and transurethanization have utilized tetraalkyl orthotitanates and/or titanium acetyl acetonates instead of the lead compounds. However, such compounds are susceptible to hydrolysis and during aging of the paint bath are responsible for increasing deficiencies in the deposited films.

SUMMARY OF INVENTION

It has now been found that lead-free cationic paints resistant to hydrolysis which yield films with excellent corrosion-resistance on bright sheet steel can be formulated if the binders are combined with titanium-containing compounds, which are obtained by reacting tetraalkyl orthotitanates and/or titanium acetyl acetonates with NH-functional β-hydroxyalkylamines, followed by reaction with formaldehyde and removal of the alcohol and/or acetylacetone formed.

The invention, therefore, relates to water dilutable, cathodically depositable electrodeposition paints which are characterized in that they contain as the paint binder, in partially or totally neutralized form,
(A) 70–99.5% by weight, preferably 80–95% by weight, of a cationic film-forming resin, and optionally an additional cationic resin, for example, a pigment grinding resin, and
(B) 0.5 to 30% by weight, preferably 5 to 20% by weight, of a reaction product of a tetraalkyl orthotitanate and/or a titanium acetyl acetonate with NH-functional β-hydroxyalkylamine compounds, subsequent reaction of this titanium compound with formaldehyde and removal of the alcohol and/or acetyl acetone formed,
with the proviso that the titanium content of the combination, based on the content of binder solids, is from 0.03 to 3.0% by weight, and preferably from 0.1 to 1.0% by weight.

GENERAL DESCRIPTION OF INVENTION

The cationic film-forming resins used as component (A) are readily available. Such resins comprise polycondensation resins, polymerization resins, or polyaddition resins containing basic groups. The preferred resins are based on polyepoxy resins wherein the polyepoxy resin is reacted with aminoalkylation products of phenols or as epoxy resin-amine adducts.

The titanium compounds used as component (B) according to the invention are obtained by reacting a tetraalkyl orthotitanate and/or a titanium acetyl acetonate with NH-functional β-hydroxyalkylamines and, after subsequent reaction with formaldehyde, with removal of the alcohol and/or acetyl acetone formed. The titanium compounds used are tetraalkylorthotitanates or titanium acetyl acetones of the formula Ti(O-alkyl)$_n$(acetyl acetonate)$_2$ wherein n=0 or 2, are commercially available. The NH-functional alkanolamine compounds which may be used according to the invention are monomethylethanolamine and the homologues thereof, as well as reaction products of primary monoamines, diamines, or polyamines with epoxide compounds or reaction products of primary alkanolamines with acrylate compounds. It is preferable to employ compounds which allow for incorporation of aliphatic molecular groups into the titanium compound formed, such as NH-functional alkanolamines obtained by reacting primary amines with aliphatic mono- or diepoxide compounds.

The titanium compounds used according to the invention are prepared by reacting the NH-functional alkanolamine compound with the tetraalkylorthotitanate or titanium acetyl acetonate, splitting off the alcohol and/or acetyl acetone formed at 60 to 120° C. Then formaldehyde is added, preferably in the form of paraformaldehyde, and the reaction mixture is kept at a temperature of 80 to 100° C. until complete homogenization. Finally, the alcohol or acetyl acetone formed during the reaction with the N-methylol group is removed from the titanium compound.

The titanium compounds used according to the invention are fully compatible even under low temperature conditions with the various cationic materials based on condensation, polymerization, and polyaddition resins. As a result of their organophilic molecule segments, the compounds remain in the resin phase of the diluted aqueous paint material and, accordingly, will also remain in a film which has been substantially dehydrated by endosmosis during electrodeposition painting. The products are not prone to hydrolytic dissociation when stored for long periods or when in the electrodeposition dipping tank. The products which may split off during stoving are volatile and ecologically harmless.

The titanium compounds used according to the invention may be added to the basic resin at any time during manufacture of the paint. They may be added in concentrated form to the binder, to any pigment grinding resin used in the paint or to the pigment paste. If any protonable groups are present, the compounds may also, however, be added to the diluted paint material in neutralized form and diluted with water and/or auxiliary solvents. During electrodeposition painting, the diluted aqueous solution of the titanium compound may also optionally be added to the bath material during the operation.

The titanium compounds used according to the invention are used in a quantity such that the paint contains 0.03 to 3.0%, preferably 0.1 to 1.0%, of titanium, based on the binder solids.

The following examples illustrate the invention without restricting its scope. All the information regarding parts or percentages relates to units by weight, unless otherwise stated.

Preparation of Component (A)

Component A-1

228 parts of bisphenol-A (1 mole) are reacted with 260 parts of diethylaminopropylamine (2 moles) and 66 parts of paraformaldehyde, 91%, (2 moles) in the presence of 131 parts of toluene as the azeotrope entrainer until 42 parts of reaction water have been separated off. After cooling to 30° C., 608 parts (2.0 moles) of a toluylenediisocyanate halfblocked with 2-ethylhexanol are added within 45 minutes. As soon as an NCO-value of virtually zero is achieved, the product is dissolved in 152 parts of diethyleneglycol dimethylether. 1400 parts of the solution thus obtained are combined with a solution of 190 parts of an epoxy resin based on bisphenol-A and epichlorohydrin, having an epoxy equivalent weight of about 190, and 250 parts (1 mole) of a glycidyl ester of a saturated tertiary $C_9$-$C_{11}$-monocarboxylic acid in 389 parts of diethyleneglycol dimethylether, and the mixture is reacted at 95 to 100° C. until an epoxy value of zero is obtained. After the addition of 40 millimoles of formic acid per 100 g of solid resin, the product can easily be diluted with water.

Component A-2

500 parts of an epoxy resin based on bisphenol-A and epichlorohydrin, having an epoxy equivalent weight of about 500, are dissolved in 214 parts of propyleneglycol monomethylether and reacted at 110° C. with 83 parts of a semiester of phthalic anhydride and 2-ethylhexanol in the presence of 0.5 g of triethylamine as catalyst until an acid number of less than 3 mg KOH/g is obtained. Then 120 parts of an NH-functional oxazolidine obtained by reacting aminoethylethanolamine, 2-ethylhexylacrylate and formaldehyde, as well as 26 parts of diethylaminopropylamine are added, and the mixture is reacted at 80° C. until the epoxy value is virtually zero. The mixture is diluted with 200 parts of propyleneglycol monomethylether and partially neutralized with 97 parts of 3N formic acid. 70 parts, calculated as solid resin, of the binder thus obtained are then homogenized for one hour at 60° C with 30 parts, calculated as solid product, of crosslinking curing component (A).

Crosslinking component (A) is prepared by reacting 396 parts of dimethylmalonate and 134 parts of trimethylolpropane for ten hours at 130° C. in the presence of 1.1 parts of zinc octoate (8% metal content), about 90 parts of methanol escaping as distillate. The finished polyfunctional ester is a colorless liquid with a hydroxy number of 16 mg KOH/g.

Component A-3

In a reaction vessel fitted with stirrer, thermometer and reflux condenser, 1000 parts of an epoxy resin based on bisphenol-A and epichlorohydrin, having an epoxy equivalent of about 500, are dissolved in 492 parts of ethylglycolacetate at 60 to 70° C., 0.2 parts of hydroquinone, and 144 parts of acrylic acid are added and the temperature is increased to 100–110° C. The reaction is continued at such temperature until an acid number of less than 5 mg KOH/g is obtained (DBZ = 1.75). Then the reaction product is combined at 60 to 70° C. with 652 parts of BMI (70%) and reacted until an NCO-value of virtually zero is obtained and wherein the DBZ=1.25 and the BNZ=1.1.

BMI=a basic monoisocyanate obtained from 1 mole of toluene diisocyanate and 1 mole of diethanolamine (70% in methylisobutylketone).

DBZ=the double bond number and corresponds to the number of terminal ethylenic double bonds per 1000 molecular weight units.

BNZ=the base number and corresponds to the number of basic N groupings per 1000 molecular weight units.

Component A-4

700 parts of B180, which is a liquid polybutadiene oil, are reacted in known manner in the presence of 0.5 parts of diphenylparaphenylenediamine as an inhibitor at 200° C. with 100 parts of maleic anhydride until the latter has totally reacted. After cooling to 100° C, 130 parts of 2-ethylhexanol are added and esterification is carried out at 120° C. until the theoretical acid number of the semiester is obtained (MAD A). B180 is about 75%

1,4-cis- and about 24% 1,4-trans- isomers of the polybutadiene which has about 1% vinyl double bonds, a molecular weight of about 1500±15%, and an iodine number of about 450 g/100 g.

110 parts of MAD A, corresponding to about 0.12 carboxyl groups, are reacted with 212 parts of a bisphenol-A and epichlorohydrin diepoxy resin, having an epoxy equivalent of about 190, in 80% solution in diethyleneglycol dimethylether at 120° C. until an acid number of virtually zero is obtained. After the addition of 108 parts of diethyleneglycol dimethylether, 59 parts of diethylaminopropylamine (0.45 mole) and 59 parts of 2-ethylhexylamine (0.45 mole), the mixture is reacted at 65 to 70° C. until an epoxy value of virtually zero is obtained. Then 114 parts of bisphenol-A (0.5 mole) and 50 parts of paraformaldehyde, 91%, (1.5 moles) are added and the reaction is continued at 60° C. until a free formaldehyde content of from 0.5 to 1% is obtained.

Preparation of Component (B)

The following components are used as NH-functional β-hydroxyalkylamine compounds for the preparation of the components (B):

HYAM 1: Reaction product of 1 mole of 2-ethylhexylamine with 1 mole of 2-ethylhexylglycidylether (MW=315).

HYAM 2: Reaction product of 1 mole of 1, 6-hexamethylenediamine with 2 moles of decenoxide (MW=488).

HYAM 3: Reaction product of 1 mole of monoethanolamine with 1 mole of 2-ethylhexylacrylate (MW=245).

HYAM 4: N-methylethanolamine.

HYAM 5: Reaction of a diepoxy resin based on polypropyleneglycol (epoxy equivalent about 320) with n-butylamine (MW=786).

The proportions of the starting products and the resulting titanium content are shown in Table 1.

TABLE 1

| | Parts of Amine | Parts of Titanium Compound | Parts of FA | Solids % in MP | Titanium Content %* |
|---|---|---|---|---|---|
| B-1 | 630 HYAM 1 | 346 TiAc | 66 | 90 | 6.8 |
| B-2 | 488 HYAM 1 150 HYAM 4 | 680 BuTi | 132 | 80 | 12.3 |
| B-3 | 490 HYAM 3 | 340 BuTi | 66 | 80 | 8.5 |
| B-4 | 630 HYAM 1 786 HYAM 5 | 692 TiAc | 132 | 90 | 6.2 |
| B-5 | 315 HYAM 1 488 HYAM 2 75 HYAM 4 | 680 BuTi | 132 | 70 | 9.4 |

BuTi = Butyl titanate
TiAc = Ti(O-butyl)$_2$(acetyl acetonate)$_2$
FA = 91% paraformaldehyde
MP = Methoxypropanol
* = based on 100% solids Preparation of the Pigmented Paints According to Invention The paints specified in Table 2 were produced from components A-1 to A-4 with compounds B-1 to B-5 using a pigment mixture of one part of carbon black and 99 parts of titanium dioxide. The solids content of the paints was adjusted with deionized water whereby the pigment-binder ratio of paints L-1 to L-5 was 0.5:1, with the solids content being 20% in each case.

TABLE 2

| Paint No. | Parts of 100% Solids Resin A | Parts of 100% Solids Resin B | Titanium Content %* | Neutralization (1) |
|---|---|---|---|---|
| L-1 | 95 A-1 | 5 B-1 | 0.34 | 45 |
| L-2 | 92 A-4 | 8 B-2 | 0.98 | 45 |
| L-3 | 95 A-3 | 5 B-3 | 0.43 | 60 |
| L-4 | 85 A-1 | 15 B-4 | 0.93 | 45 |
| L-5 | 90 A-2 | 10 B-5 | 0.94 | 45 |

*based on 100% solids
(1) mMoles of formic acid per 100 g of solid resin

Testing of the Paints According to the Invention and Comparison Examples

Deposition is effected on a non-phosphatized steel sheet connected up as the cathode of an electrodeposition system under conditions such that a dry film thickness of °±2 μm is obtained. Curing is effected by stoving in a circulating air oven for 25 minutes at 170° C.

The test results obtained for the salt spray test (ASTM B-117-73) given in Table 3 indicate the degree of attack on a cross-shaped cut in millimeters after 240 hours. As a comparison, the paints L-1 to L-5 without the titanium component were deposited and tested. The corresponding values for the salt spray test range from 40 to 70 mm.

TABLE 3

| Example | Salt Spray Test mm/240 Hours |
|---|---|
| L-1 | less than 1 |
| L-2 | less than 1 |
| L-3 | less than 2 |
| L-4 | less than 0.5 |
| L-5 | less than 0.5 |

As will be apparent to one skilled in the art, various modifications can be made within the scope of the aforesaid description. Such modifications being within the ability of one skilled in the art form a part of the present invention and are embraced by the appended claims.

IT IS CLAIMED:

1. A water-dilutable, cathodically depositable electrodeposition paint comprising a binder, in partially or totally neutralized form, containing
   (A) 70-99.5% by weight of a cationic film-forming resin, and
   (B) 0.5-30% by weight of a reaction product of a tetraalkyl orthotitanate or a titanium acetyl acetonate with an NH-functional β-hydroxyalkylamine compound, subsequently reacted with formaldehyde and with removal of the alcohol and/or acetyl acetone formed,
   with the proviso that the titanium content of the combination, based on the content of binder solids, is from 0.03 to 3.0% by weight.

2. The electrodeposition paint of claim 1 wherein component (A) comprises from 80 to 95% by weight and component (B) comprises from to 20% by weight of the binder.

3. The electrodeposition paint of claim 1 wherein the NH-functional β-hydroxyalkylamine compound of component (B) is the reaction product of a primary monoamine or polyamine with an epoxide compounds.

4. The electrodeposition paint of claim 1 wherein the NH-functional β-hydroxyalkylamine compound of component (B) is monoethylethanolamine or homologues thereof.

5. The electrodeposition paint of claim 1 wherein the NH-functional β-hydroxyalkylamine compound of component (B) is the reaction product of a primary alkanolamine with an acrylate compound.

6. The electrodeposition paint of claim 1 wherein said titanium content is from 0.1 to 1.0% by weight of binder solids.

7. The electrodeposition paint of claim 1 wherein the tetraalkyl orthotitanates or titanium acetyl acetonate of component (B) has the general formula Ti(O-alkyl)$_n$(acetyl acetonate)$_2$ wherein n=0 or 2.

8. The electrodeposition paint of claim 1 wherein component (B) is added to a water-free form of component (A), or to a pigment grinding resin which constitutes a portion of component (A), or to a pigment paste which constitutes a portion of component (A).

9. The electrodeposition paint of claim 1 wherein protonable groups are present in component (B) and the protonized component (B) is added to component (A) in an aqueous and/or solvent-containing form.

* * * * *